United States Patent Office 3,563,650
Patented Feb. 16, 1971

3,563,650
**FLASH DISCHARGE LAMP DEVICE
FOR PHOTOGRAPHY**
Keno Okuno, Kawasaki-shi, Japan, assignor to Nippon
Kogaku K.K., Tokyo, Japan, a corporation of Japan
Filed Aug. 5, 1968, Ser. No. 750,055
Claims priority, application Japan, Aug. 26, 1967,
42/73,111
Int. Cl. G03b 27/76
U.S. Cl. 355—71        3 Claims

ABSTRACT OF THE DISCLOSURE

A flash discharge lamp device is provided for a camera lens for a magnifying or close-up photographic device. An adapter fitting the lens mounting of an inversely mounted lens on the extension bellows secured to the camera body, is provided with an illuminating lamp and a flash discharge lamp. A push button and plunger, upon depression, closes a switch to complete an electrical circuit for the illuminating lamp and operates a diaphragm lever to open the lens diaphragm to its full aperture to permit focussing of the illuminated object to be photographed. Release of the push button opens the switch and permits the diaphragm to be closed down by the diaphragm spring mechanism of the lens to a preset opening and permits a flash exposure to be made in the usual manner.

---

This invention relates to a flash discharge lamp device for a close-up or magnifying photographic device, and more particularly to a device whereby the object to be photographed is illuminated and the lens aperture opened to its full aperture stop to permit focussing of the illuminated object, a flash exposure of the object being made in the usual manner after the lens aperture is closed down and the illumination of the object extinguished.

In close-up or magnification photography, an extension bellows is secured to the lens mounting ring on the camera body, the lens being inversely mounted on the bellows. The lenses provided for single lens reflex cameras are now provided with automatic stop mechanisms whereby the desired aperture opening is preset by the manual operation of the stop ring or lever. The mechanism holds the aperture in its full open position until release of the shutter mechanism, the automatic stop mechanism closes down the aperture to the stop value set by the manual setting of the ring or lever.

With the bellows attachment to the camera body in taking close-up exposures of objects, the interconnection of the stop mechanism and shutter mechanism is no longer feasible. With no interconnection between the stop and shutter mechanisms, it is necessary to open the lens aperture manually each time a focussing operation is carried out. In recently developed lenses having a detent mechanism for the stop mechanism there is the possibility that shock and frictional wear have damaged the mechanism so that the focussing or exposure settings of the aperture are not held by the detent. It is possible to provide a lens with an attachment having a mechanism for opening the diaphragm to its full stop by operating a stop lever during focussing. In close-up photography, the depth of focus becomes smaller requiring a reduction of the aperture opening. With the closing down of the stop, the image viewed in the viewfinder of a single lens reflex camera becomes very dark, thus requiring some form of illumination during viewing. This type of illumination when mixed with the illumination provided by a flash or speed light will vary the color temperature of the light. Additionally, shutter vibration, even though small, effects the image photographed so that the illumination of the object to be photographed by flash or speed light becomes significant.

The object of the present invention is to provide a flash lamp discharge device for close-up photography for attachment to an inversely mounted lens in which an aperture control and illumination is provided for the focusing operation and a flash discharge lamp provides the illumination for exposure, the illumination for focussing being provided only during the focussing operation so that there is no unnecessary drain on the battery supply when used, and no overlapping with the speed light to vary the illumination thereof or change the color temperature.

In accordance with the invention, a flash discharge lamp device is provided for a camera lens in which an illuminating lamp and a flash discharge lamp are mounted, separate electrical circuits being provided for each lamp. The synchronizing switch of the camera closes the flash lamp circuit upon shutter release, while a switch closed upon depression of a push button plunger completes the illuminating lamp circuit. The push button plunger upon depression also coacts with the aperture lever of the lens to open the lens to its full stop opening for focussing of the illuminated object to be photographed.

This invention will be described more clearly referring to the illustrative embodiments shown in the attached drawings, in which.

Figure 1:
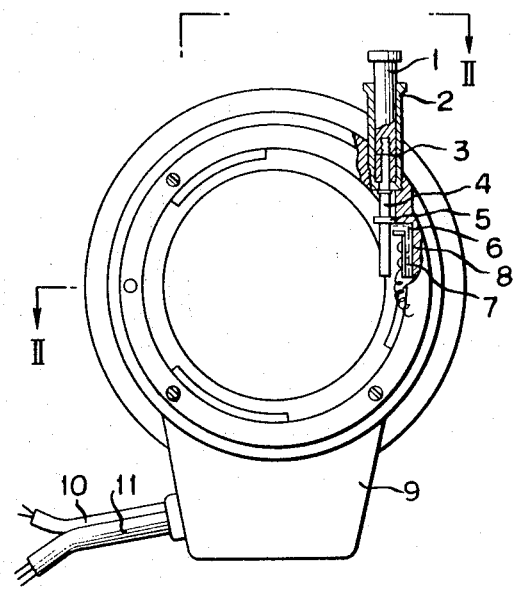
FIG. 1 is a rear side view of the illuminating portion of an embodiment of this invention, and a part thereof is shown by cross-section.

Referring now to FIG. 1 there is disclosed a flash lamp device embodying the invention in which a push button 1 is slidably received in a barrel 2 fixed in a body 13 of the device. A spring 3 is provided for the push button 1 within the barrel to return the push button to its original position after finger pressure is removed. The push button 1 is secured to a plunger 4 formed with a projection 5, the projection 5 being of insulating material and adapted to coact with normal open contacts 6 and 8 secured in the body 13 as by a mounting 7 of insulation material. Forming a part of the body 13 is a circuit housing 9 into which the cables 10 and 11 are led; the cable 10 being connected to the synchronous contacts 20 of the camera (FIG. 4), while cable 11 is an electrical connection to a source of voltage (FIG. 4).

Figure 2:
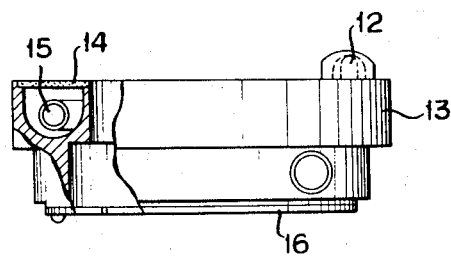
FIG. 2 is the side view on line II—II of FIG. 1.
Figure 3:
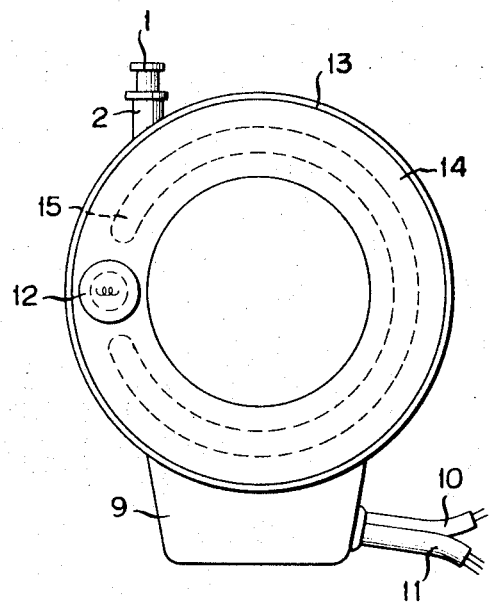
FIG. 3 is the front view of this embodiment.

In FIG. 2 it will be noted that the body 13 is provided with a recess in which is disposed an illuminating lamp 12. The body is also formed with an arcuate recess covered by a transparent protective or dispersing plate 14, an arcuate formed discharge lamp 15 being disposed within the recess under the cover. The body 13 is further provided with mounting means 16 for mounting the body on the lens.

Figure 4:
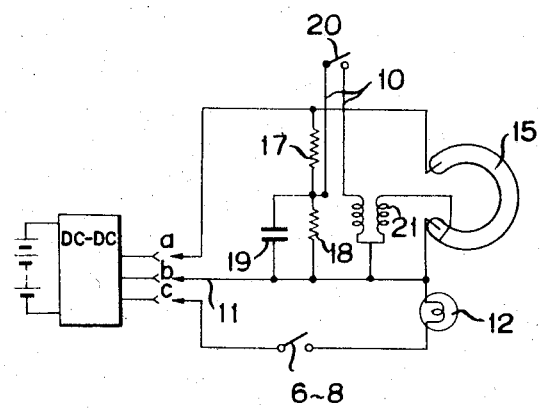
FIG. 4 is a diagram of an electric circuit.

In FIG. 4 the electrical circuit diagram is illustrated for the illuminating lamp 12 and the flash discharge lamp 15, the circuit elements being mounted within the housing 9. In the illustrated circuit, resistors 17 and 18 constitute a voltage divider and condensor 19 the trigger condensor for the flash lamp 15. The switch 20 is illustrated connecting the trigger condensor 19 and a trigger transformer 21 in the electrical circuit supplied by the battery terminals a, b, c; the switch 20 being representative of a synchronous contact provided on most cameras for limiting the flash discharge of a lamp in synchronism with the release of the camera shutter.

Figure 5:
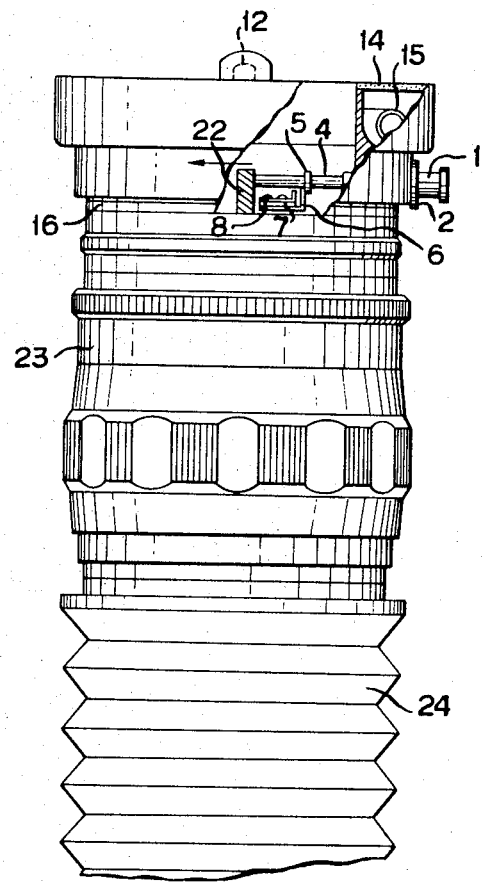
FIG. 5 is a side view showing the state in which the flash discharging lamp of the embodiment of this invention is provided on the lens which is fitted to the bellows unit.
Figure 6:
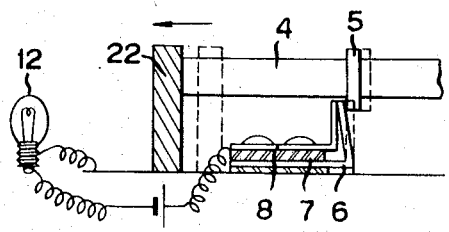
FIG. 6 is a diagram showing the operations of the switch portion.

Referring now to FIG. 5, the body 13 is shown mounted on a lens 23 which in turn is mounted on an extension bellows 24. The lens 23 is of the well known interchangeable type wherein the diaphragm is provided with an automatic preset stop mechanism, the release of the shutter mechanism closing down the diaphragm to a preset opening, the diaphragm again opening to its full aperture after an exposure is made. A diaphragm operating member 22 for the lens 23 is illustrated in the drawing whereby the diaphragm can be opened to its full open position. When the push button 1 is depressed, the end of the plunger 4 abuts the diaphragm member 22 moving it to the left in FIG. 5 to open the diaphragm. At the same time the abutment 5 provided on the plunger 4 engages the contacts 6 and 8 to complete the electrical circuit for the illuminating lamp 12 (FIG. 6). When the push button is released the return spring 3 will lift the push button and plunger 4 to permit the contacts 6, 8 to open and release the aperture lever 22, the aperture lever returning to its dashed line position in FIG. 6.

The inverse mounting of the lens 23 on the bellows 24 does not permit the usual interlock between the camera mechanism and the automatic stop mechanism of the lens. The proposed device for mounting on the lens mounting provides a push button for operating the stop lever of the lens and for closing a circuit for an illuminating lamp to illuminate the object while focussing with the lens wide open. With the interlock provided between the aperture operating lever and the illuminating lamp circuit, sufficient illumination is provided to carry out the focussing operation, the lamp being extinguished and the aperture reset upon release of the push button prior to the flash exposure. With the illuminating lamp extinguished, the color temperature of the subsequent flash exposure will not be altered by the illuminating lamp.

What is claimed is:

1. A flash discharge device for close-up photography wherein a lens is mounted inversely on an extension bellows fixed to the camera body, the combination comprising:

a camera objective having means for mounting the objective on a camera body, a preset automatic aperture stop means operable upon shutter release to a preset stop opening and an aperture operating lever movable to the full stop position of the objective; and a member having coupling means for mounting the member on the objective mounting means, an illuminating lamp and a flash discharge lamp mounted on said member, separate electrical circuits including a power source for said lamps, a normally open switch in the illuminating lamp circuit, a push button and plunger mounted on said member to close said switch upon depression of the push button to energize the illuminating lamp, said plunger coacting with said aperture operating lever of the objective to open its aperture to its full stop upon depression of the push button, and a circuit connection in the flash discharge lamp circuit to the synchronous switch of the camera for completing the flash circuit upon shutter release.

2. A flash discharge device according to claim 1, wherein the member is formed with an arcuate recess coaxial with the coupling means of the member, the flash discharge lamp being disposed within the arcuate recess.

3. A flash discharge device according to claim 1, wherein the member is a cylindrical housing having the lamps and the normally open switch therein, and an extended housing on said cylindrical housing for enclosing the flash discharge lamp circuit elements.

References Cited

UNITED STATES PATENTS 1,844,179    2/1932    Rennick _____ 355—71

JOHN M. HORAN, Primary Examiner

D. J. CLEMENT, Assistant Examiner

U.S. Cl. X.R.

95—11, 64